United States Patent [19]

Meyer-Kretschmer et al.

[11] 4,451,437
[45] May 29, 1984

[54] METHOD FOR SEPARATING DIFFERENT ISOTOPES IN COMPOUNDS BY MEANS OF LASER RADIATION

[75] Inventors: Gustav Meyer-Kretschmer, Jülich; Heinz Jetter, Feldkirchen; Peter Toennies, Göttingen, all of Fed. Rep. of Germany

[73] Assignee: URANIT Uran-Isotopentrennungs-GmbH, Jülich; Fed. Rep. of Germany

[21] Appl. No.: 337,187

[22] Filed: Jan. 5, 1982

Related U.S. Application Data

[63] Continuation of Ser. No. 051,240, Jun. 22, 1979, abandoned.

[30] Foreign Application Priority Data

Jul. 7, 1978 [DE] Fed. Rep. of Germany ....... 2829881

[51] Int. Cl.³ ...................... B01D 59/00; B01D 59/50
[52] U.S. Cl. ..................................... 423/3; 250/423 P; 250/283; 204/157.1 R
[58] Field of Search .................. 23/293; 204/157.1 R; 250/423 P, 283; 423/3

[56] References Cited

U.S. PATENT DOCUMENTS

| | | | |
|---|---|---|---|
| 3,951,768 | 4/1976 | Gurs | 204/157.1 R |
| 4,000,051 | 12/1976 | Kaldor | 204/157.1 R |
| 4,023,038 | 5/1977 | Janes et al. | 250/423 P |
| 4,031,389 | 6/1977 | Russell et al. | 250/283 |
| 4,107,537 | 8/1978 | Forsen et al. | 250/423 P |
| 4,110,182 | 8/1978 | Stevens | 204/157.1 R |
| 4,176,025 | 11/1979 | Chen et al. | 204/157.1 R |
| 4,334,883 | 6/1982 | Robinson et al. | 23/293 R |

OTHER PUBLICATIONS

Katz et al., *The Chemistry of Uranium, Part I* McGraw-Hill Book Co. Inc., N.Y., (1951), pp. 437–438.
Jackson et al., "Temperature Dependence of the Dissociative Ionization . . . " *Chem. Abstracts* 80:138291d (1974).
Ronn, "Laser Chemistry", *Scientific American*, May 1979, pp. 114–128.
Robinson et al., "Some Developments of Laser Isotope Sep. Research at Los Alamos," LA-UR-76-191 (1976).

*Primary Examiner*—Brooks H. Hunt
*Attorney, Agent, or Firm*—Spencer & Frank

[57] ABSTRACT

A method for separating isotopes of a compound having molecules in the gaseous state which comprises exciting the gas with laser radiation having a frequency capable of exciting a selected isotope thereof, interacting the excited gas with electrons having an energy sufficient to form position ions therein and separating the ionized molecules from the other molecules in the gas.

7 Claims, 2 Drawing Figures

METHOD FOR SEPARATING DIFFERENT ISOTOPES IN COMPOUNDS BY MEANS OF LASER RADIATION

This is a continuation of application Ser. No. 51,240, filed June 22, 1979, now abandoned.

BACKGROUND OF THE INVENTION

The present invention relates to a method for separating isotopes of compounds whose molecules are in a gaseous state. More particularly, the vibratory state of the molecules is isotope specifically changed by exciting the gas with laser radiation having a predetermined frequency, the molecules brought into interaction with electrons and the ionized molecules then separated from the other molecules by chemical or physical methods.

U.S. Pat. No. 3,443,087 discloses a method of separating the compounds $^{235}UF_6$ and $^{238}UF_6$ by selectively exciting one of two types of molecules with an infrared laser, ionizing the excited molecules with ultraviolet radiation and then separating the ions from the nonionized molecules with the aid of electrical or magnetic fields or by means of chemical reactions.

German Offenlegungsschrift No. 26 17 043 teaches the combination of compounds, which have been isotopically selectively excited into vibration by means of an infrared laser, with thermal electrons so as to form negative ions which decompose into ion fractions that can be separated from the isotope mixture. However, as described in a paper by J. L. Beauchamp, Journ. Chem. Phys. No. 64 (1979) 718, the formation of stable negative $UF_6$ ions takes place only under the influence of extremely slow electrons having a very small effective cross section. The generation of such slow electrons is technically quite difficult and, due to space charge effects, is limited to current densities of a few microamperes per square centimeter. Moreover, in addition to the desired reaction, an undersirable decay of $UF_6^-$ into $UF_6 + e^-$ also occurs.

It is an object of the present invention to provide a method of increasing the ionization probability of the molecules which have been brought into a state of vibration in an isotope-specific manner by means of laser radiation, and to facilitate or simplify the subsequent separation process.

SUMMARY OF THE INVENTION

In the present invention, excited molecules are brought, by means of an electron beam or a low pressure gas discharge, into interaction with electrons above the required ionization energy. For $UF_6$ molecules, the electron energy is set to a value greater than 13 eV which corresponds to the required ionization energy. As a result, positive ions are formed of the type $UF_6^+$, $UF_5^+$, $UF_4^+$, $UF_3^+$, $UF_2^+$, $UF^+$ and $U^+$ as well as $UF_5^{++}$, $UF_4^{++}$, $UF_3^{++}$, $UF_2^{++}$, $UF^{++}$ and $U^{++}$.

DESCRIPTION OF THE PREFERRED EMBODIMENTS

Figure 1:
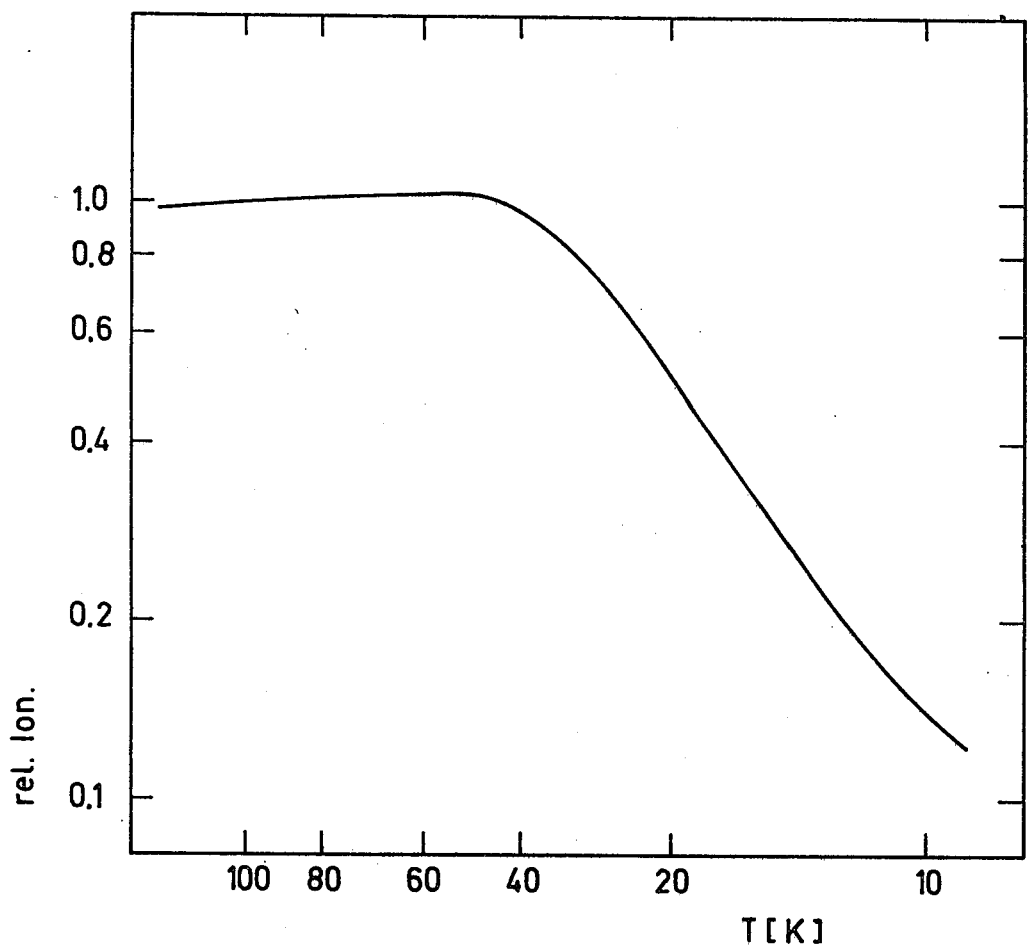
FIG. 1 is a diagram showing the relative ionization probability of the $UF_6$ molecule as a function of absolute temperature.

It has been found that the total effective cross section for the formation of ions depends on the vibration state of the $UF_6$ molecule and therefore on the internal temperature of the molecule. FIG. 1 shows the relative ionization cross section as a function of temperature as determined in a stream of $UF_6$ gas that had been cooled by adiabatic expansion. During cooling, the ionization cross section initially remains constant, and then drops very rapidly with decreasing temperature after reaching T=50° K. Since the cross section in the ground vibration state is substantially less than in the excited levels, FIG. 1 represents the occupation of the ground state.

Consequently, the occupation of the ground state of the molecules of a certain isotopic composition is reduced in the cooled gas stream by means of selective excitation with narrowband laser light as disclosed, for example, in co-pending U.S. Pat. application Ser. No. 969,939 filed Dec. 15th, 1978. This means an increase in the ionization cross section. Upon bombardment with electrons of an energy higher than 14 eV, ions having the respective excited isotope type are formed with a significantly greater probability than ions having the nonexcited type of isotopes.

Figure 2:
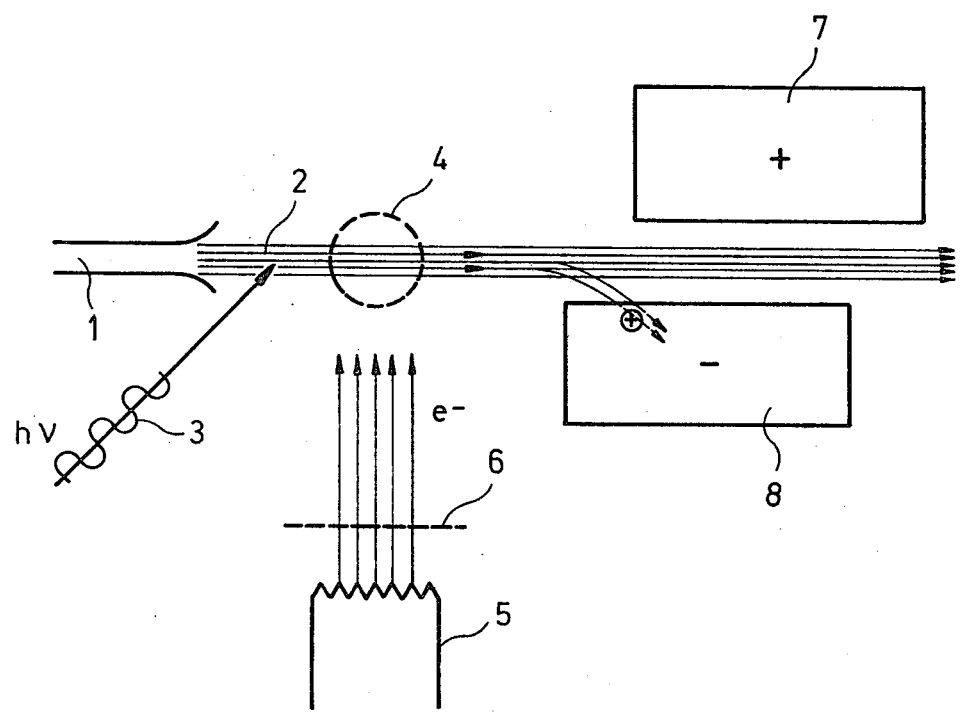
FIG. 2 is a schematic representation of an arrangement for practicing the method of the invention.

FIG. 2 is a schematic representation of an arrangement in which the method is used for the separation of uranium isotopes. A mixture of $UF_6$ and a carrier gas, e.g. helium, is permitted to expand through a nozzle 1 into an area of lower pressure. In the thus formed gas stream 2, the $UF_6$ gas is cooled to such an extent that almost all molecules are present in the ground vibration state. This meets all requirements for isotope selective excitation of molecule vibrations.

Excitation of the gas stream may be achieved by a iodine laser that produces a beam 3. Advantageously, the laser is tuned to the Q-branch absorption line of the $^{235}UF_6$ molecule containing the isotope of interest. Following the laser excitation zone, the gas jet traverses the ionization zone 4. Here it is bombarded with electrons emitted from cathode 5 and accelerated toward the anode grid 6 to energies of more than 14 eV. The resulting positive ions are deflected, in an electric field applied between plates 7 and 8, in a direction perpendicular to the direction of the jet, so that they impinge on the cooled negative electrode 8. At electrode 8, they are neutralized and condense in the form of $UF_6$, $UF_5$ or $UF_4$. Once a sufficient quantity of the enriched material has been deposited, the separating process is interrupted and the deposit present on electrode 8 reconverted to $UF_6$ by heating and fluorization. The gas may then again be subjected to the separating process.

Compared to known methods for separating selectively excited molecules, this method has the following important advantages:

(a) Since the effective cross section for ionization of $UF_6$ in the ground state is smaller by more than a factor of 10 than in the simply excited vibration state, the absorption of one or a few infrared quanta is sufficient to greatly increase the ion yield. Thus, the method requires a laser having only a relatively weak power output and utilizes the produced photons very effectively.

(b) The electrons required for ionization can be produced in sufficient amounts without expensive equipment and with low energy consumption.

(c) There is only a slight probability that processes will occur which result in reversal of isotope selectivity during ion formation.

The exchange of charges between the $^{235}UF_6^+$ ion and the neutral $^{238}UF_6$ molecule would be such an effect. This exchange is resonant and therefore has a large effective cross section. However, the $UF_6^+$ ion is formed only to a very slight amount during electron impact, more than 95% of the ions being present as fragments $UF_n^+$, where n=0-5. Charge exchanges between these fragments and the neutral $UF_6$ molecules are not resonant and therefore have only a small effective cross section.

Since in addition to $UF_6$ the gas jet contains a carrier gas (e.g. helium), ions of the carrier gas will also be formed if the electron energy is appropriate. Between these ions and the neutral $UF_6$ molecules, there may again be a charge exchange which leads to the nonspecific formation of $UF_6$ ions. This can be prevented if the electron energy is selected so that it is sufficient for the ionization of $UF_6$ molecules but not for the atoms or molecules of the carrier gas. In the example of a $UF_6$-helium mixture this means that the electron energy must lie in the region between 14 eV and 25 eV.

Finally, ion impact can serve to form further ions if the primary ions in the electric field between plates 7 and 8 are accelerated to more than 14 eV. However, for the deflection of ions from the gas jet, a voltage of less than 14 eV is sufficient so that this process can be avoided.

The deflection of the ions from the gas jet may also be effected by a magnetic field which is perpendicular to the jet. The ionization may also take place in a low pressure discharge fed by a high voltage or microwave source.

The described method makes it possible to obtain uranium isotope separation in a particularly simple and effective manner. Compared to prior art methods, it has the advantage that enrichment which is sufficient for light water reactor fuel can be realized in one step. Since only a relatively small laser and a simple electron source are required, such a system can be assembled with low investment costs. The energy requirement is less than for all known methods and is determined essentially by the compressor output required for the adiabatic expansion.

Since for all molecules with spherical symmetry the total ionization cross section depends particularly on the vibration state, this method can also be used to advantage for isotope separation of numerous other elements. For example, separation from the hexafluorides to the elements sulphur, selenium, tellurium, tungsten, molybdenum and plutonium.

It will be understood that the above description of the present invention is susceptible to various modifications, changes and adaptations, and the same are intended to be comprehended within the meaning and range of equivalents of the appended claims.

What is claimed is:

1. A method for separating uranium isotopes of uranium hexafluoride having molecules in the gaseous state comprising the steps of:
   (a) mixing said uranium hexafluoride with an inert additive gas;
   (b) cooling the resulting mixture by adiabatic expansion to a temperature below 50° K.;
   (c) exciting said uranium hexafluoride molecules with laser radiation having a frequency which is selective for a predetermined uranium isotope;
   (d) interacting said uranium hexafluoride molecules with electrons having energies in excess of 14 electron volts thereby producing positive ions by electron bombardment; and
   (e) separating said ionized uranium hexfluoride molecules from the nonionized molecules.

2. The method defined by claim 1 wherein the frequency of said laser radiation corresponds to the Q-branch absorption line of the $^{235}UF_6$ molecule containing said selected isotope.

3. The method defined by claim 1 wherein the positive ions formed are of the type $UF_n^+$, where n is an integer equal to 0, 1, 2, 3, 4, 5 or 6 and $UF_m^{++}$, where m is an integer equal to 0, 1, 2, 3, 4 or 5.

4. The method defined by claim 1 wherein the step of separating said ionized uranium hexafluoride molecules from said nonionized molecules in said mixture is performed by use of an electric field.

5. The method defined by claim 4 or 1 wherein the step of interacting said uranium hexafluoride molecules with electrons is performed by penetrating said molecules with an electron beam.

6. The method defined by claim 5 wherein sad inert additive gas is helium.

7. The method defined by claim 6 wherein said uranium hexafluoride is interacted with electrons having energies in the range 14 to 25 electron volts.

* * * * *